United States Patent
Belanger

(10) Patent No.: US 6,647,745 B1
(45) Date of Patent: Nov. 18, 2003

(54) METHOD FOR CONTROLLING THE OPERATION OF A CRYOGENIC RECTIFICATION PLANT

(75) Inventor: William Paul Belanger, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/310,020

(22) Filed: Dec. 5, 2002

(51) Int. Cl.[7] .............................. P25J 3/00; G05B 21/00; G05D 13/02; G05E 1/00
(52) U.S. Cl. .................. 62/656; 62/657; 700/270; 700/273; 706/23
(58) Field of Search ............... 62/656, 657; 706/23, 706/13; 700/270, 273

(56) References Cited

U.S. PATENT DOCUMENTS

| | | | |
|---|---|---|---|
| 5,025,499 A | * 6/1991 | Inoue et al. | 706/62 |
| 5,156,013 A | * 10/1992 | Arima et al. | 62/148 |
| 5,377,308 A | * 12/1994 | Inoue et al. | 706/52 |
| 5,406,800 A | 4/1995 | Bonaquist | 62/21 |
| 5,505,051 A | 4/1996 | Darredeau et al. | 62/21 |
| 5,518,671 A | * 5/1996 | Takizawa et al. | 264/40.1 |
| 5,666,825 A | 9/1997 | Darredeau et al. | 62/656 |
| 5,963,447 A | * 10/1999 | Kohn et al. | 700/49 |
| 5,996,373 A | 12/1999 | Greter et al. | 62/656 |
| 6,006,546 A | 12/1999 | Espie | 62/656 |
| 6,055,524 A | * 4/2000 | Cheng | 706/23 |
| 6,070,433 A | 6/2000 | Smith, IV et al. | 62/648 |
| 6,138,474 A | 10/2000 | Smith, IV et al. | 62/656 |
| 6,272,884 B1 | 8/2001 | Billingham et al. | 62/656 |
| 6,415,272 B1 | * 7/2002 | Ulyanov | 706/2 |

FOREIGN PATENT DOCUMENTS

EP    1058168    6/1999

* cited by examiner

*Primary Examiner*—William C. Doerrler
(74) *Attorney, Agent, or Firm*—Stanley Ktorides

(57) ABSTRACT

A method for controlling the operation of a plant such as a cryogenic rectification plant wherein process parameters are quantitatively determined and then are qualitatively categorized to establish by reference to a rule set the general adjustment required for a plant element prior to determining the numerical adjustment for that element.

6 Claims, 5 Drawing Sheets

Fuzzification of variable D1

Fuzzification of variable dD1dt

Fuzzification of variable D2

Fuzzification of variable dD2dt

Fuzzification of variable D3

Fuzzification of variable dD3dt

Classification of variable dLV315dt

Classification of variable dLV300dt

Classification of variable dHIC1737dt

Classification of variable dHIC1740dt

METHOD FOR CONTROLLING THE OPERATION OF A CRYOGENIC RECTIFICATION PLANT

TECHNICAL FIELD

This invention relates generally to controlling the operation of a plant, particularly a cryogenic rectification plant, and is particularly useful for controlling the start up of a cryogenic rectification plant.

BACKGROUND ART

The start up of any industrial plant is a complex task whose proper execution requires a significant amount of expertise on the part of the operator(s). Due to the complexity of the procedures, even the most skilled operators can deviate significantly from established "best practices", resulting in increased start up times, wasted energy, reduced equipment life, etc. Additionally, in environments where the operation of groups of plants is centralized (i.e. one operator is responsible for the operation of more than one plant), the attention required to start up one plant takes away manpower available to operate others. It is therefore desirable to automate start ups as fully as possible.

The current state of the art when it comes to automating a cryogenic rectification plant during start up involves a "recipe", based program. Here, the word "recipe" is used to mean that events are carried out in the same manner regardless of how the plant is responding to the events. Many plants have programs designed to start up equipment and ramp key flow rates and ratios in a consistent fashion for every automated start (consistent here meaning that equipment is always started in the same order and key flows and flow ratios are always ramped from their starting values to operator specified target values in the same fashion for each start up). While a "recipe" based program can significantly decrease the manpower required to start up a plant and significantly improve start up reliability, there are some key areas where improvements can be made. In particular, it is often necessary for an operator to closely observe an automated start and take corrective action when the "recipe" based program performs actions that are inappropriate given the current state of the plant. If the corrective actions performed by the operator are found to be of a repetitive nature (focusing on the same tasks each time) and his/her actions follow a set of well-defined rules (as in the case of liquid inventory management), then these activities can be automated.

The main obstacle to automating the activities of an operator for start up is that the behavior of the plant under start up conditions is non-conducive to traditional feedback control techniques. The non-linear nature of the plant makes it difficult to design a traditional controller that will provide reasonable performance while maintaining stability. The operator, unlike a traditional controller, is able to take the proper actions because his/her extensive experience with the plant provides an intuitive feel for how the plant will respond to certain actions. Such intuition is difficult to incorporate into a traditional controller and is perhaps the reason that "recipe" based systems (systems that lack feedback) remain popular.

Accordingly it is an object of this invention to provide an improved method for controlling a plant, particularly a cryogenic rectification plant, which can be effectively used in the start up of the plant.

SUMMARY OF THE INVENTION

The above and other objects, which will become apparent to those skilled in the art upon a reading of this disclosure, are attained by the present invention which is:

A method for controlling the operation of a plant comprising:

(A) determining the value of a plant process parameter, comparing the determined value to the desired value for that parameter, calculating the difference between the determined value and the desired value, and calculating the rate of change of said difference between the determined value and the desired value;

(B) qualitatively categorizing the said difference between the determined value and the desired value, and qualitatively categorizing the said rate of change of said difference between the determined value and the desired value;

(C) determining by referring to a set of rules for qualitative categories how such process parameter should be changed to become closer to the desired value;

(D) determining a numerical value for adjusting a plant element to change such process parameter to become closer to the desired value; and (E) adjusting said plant element to change such process parameter so that it is closer to the desired value.

DETAILED DESCRIPTION

In general the invention employs a fuzzy logic system to replicate the decision making logic of an operator by converting numerical values for parameters and changes in parameters to qualitative categories, and then using these qualitative categories to determine how to change the state of the plant by referring to a set of rules for such qualitative categories.

The invention will be described in detail with reference to a specific embodiment wherein the plant is a cryogenic rectification plant comprising an upper column, a lower column and a side column, the parameter is column liquid level, and the plant element which is adjusted is a flow valve. The description of this embodiment will be done with reference to the Drawings.

Figure 1:
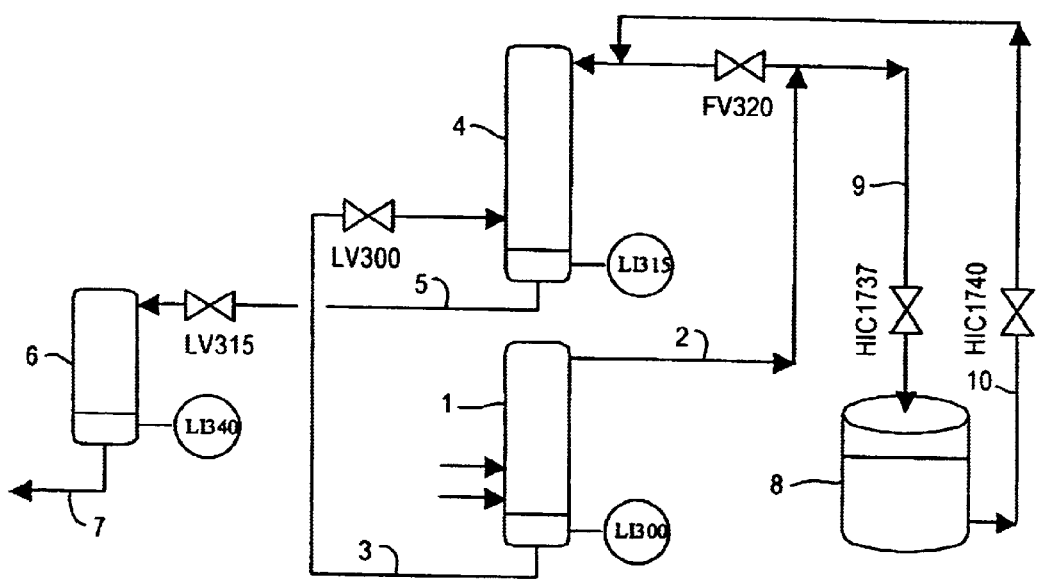
FIG. 1 is a simplified schematic representation of one arrangement wherein the control method of the invention may be practice.

In this embodiment of the invention there is described the management of liquid inventories during the plant start up. The plant distillation columns, storage tanks, valves and relevant liquid flow paths of the system to be controlled are shown in FIG. 1. Referring now to FIG. 1, the cryogenic rectification plant system comprises three distillation columns and a storage tank. Liquid and vapor air enter the lower column 1 where nearly pure liquid nitrogen, referred to as the "shelf stream" is withdrawn as the distillate 2. A liquid enriched in oxygen, referred to as the "kettle stream"

is withdrawn as the bottoms 3. The shelf stream flows through valve FV320 into the top of the upper column 4. The kettle stream 3 is introduced to the upper column 4 via valve LV300. A liquid stream 5 that comprises greater than 50% oxygen on a molar basis flows through valve LV315 into the top of a side stripper 6. This side stripper produces liquid oxygen product as a bottoms stream 7. A storage tank 8 exists to provide refrigeration if necessary to the system during start up. During normal operation excess liquid 9 may be withdrawn from the shelf stream through valve HIC1737 to be stored in tank 8. During start up, liquid nitrogen may be withdrawn in stream 10 from tank 8 through valve HIC1740 and introduced as reflux to the top of upper column 4.

Conventional controllers are linear (meaning they behave in exactly the same fashion regardless of where the system is currently operating). Ordinarily during a start up there are some fairly substantial swings in liquid levels, requiring more aggressive action on the part of the controller. Since the controllers are tuned to provide stable, non-oscillatory behavior at the normal operating condition, they are unable to provide the aggressive action necessary when the liquid levels stray far from their desired values. This is another area where operator intervention becomes necessary. Often it is the case that a controller will be placed in manual, then a manual change in valve position is made, then the controller is placed back to automatic.

The invention carries out its control functions in a non-linear fashion. In other words, it is much more aggressive when wild swings in level are seen (as is the case during start-up), and is gentle in the region of normal operation. This eliminates the need for the operators to intervene.

The invention controls the three sump levels simultaneously by manipulating LV300, LV315, HIC1737, and HIC1740. Thus, rather than the side column level fluctuating wildly, the liquid level in the storage tank is allowed to fluctuate. Since the liquid level in the storage tank is not nearly as important and due to the size of the storage tank, level changes in this tank are much more acceptable than the fluctuations previously seen in the side column level.

Figure 2:
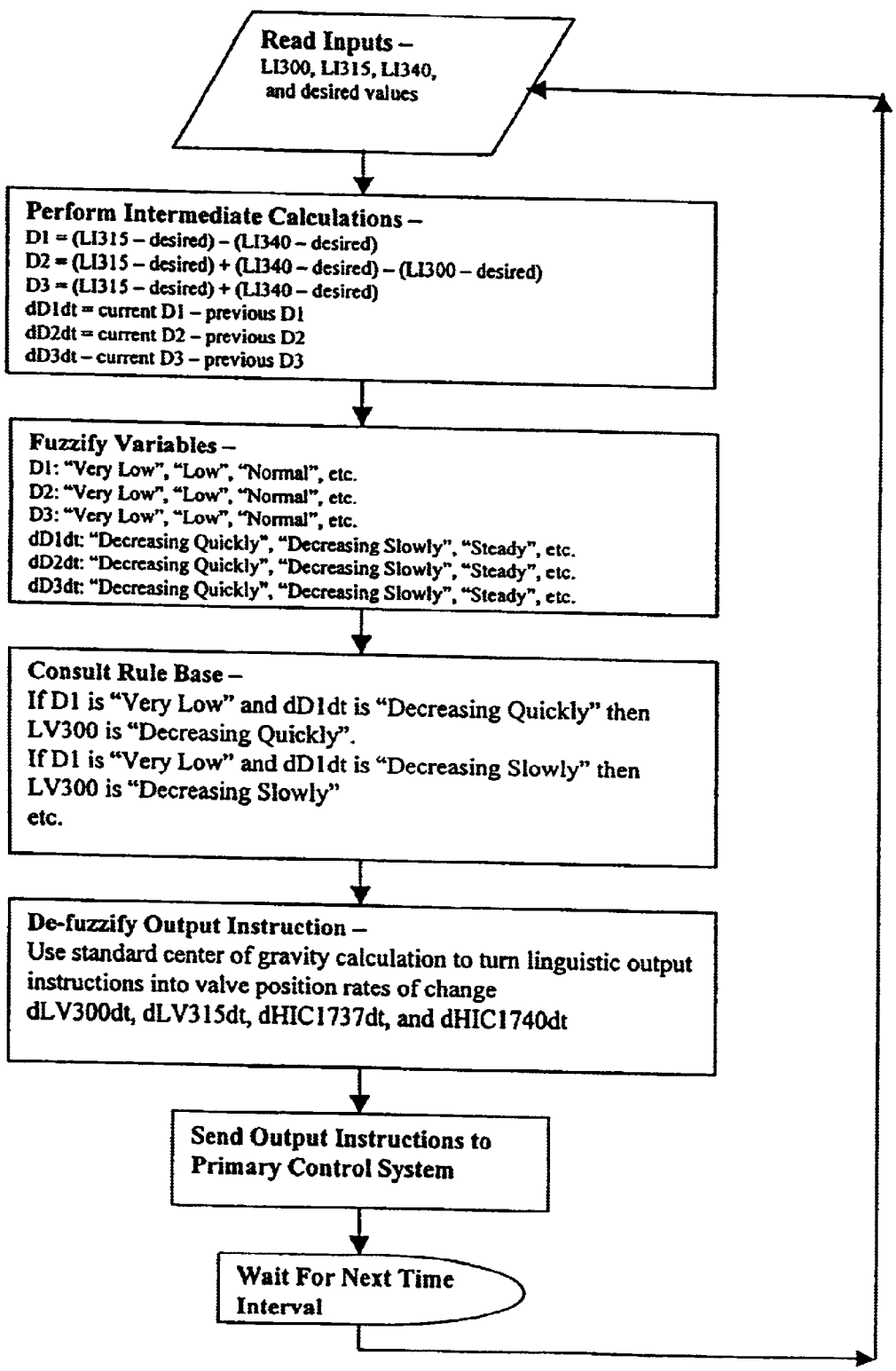
FIG. 2 is a controller logic diagram for one embodiment of the invention carried out with the arrangement illustrated in FIG. 1.

FIG. 2 shows a general overview of the steps performed by the controller for regulating the liquid levels of the process. The first step performed is the reading of inputs, namely the liquid levels and the desired value for each level, from the plant control computer.

Next, auxiliary variables are calculated. Standard practice is to make changes in the position of LV315 based solely on LI315, regardless of the error in LI340. With the invention LV315 is moved only if the error in the upper column sump level is much greater or much less than the error in the side column level. Thus the auxiliary variable D1, calculated as the difference in the errors of LI315 and LI340, is used to determine how to move LV315. Similarly, the auxiliary variable D2, calculated as the sum of the errors of LI315 and LI340 minus the error of LI300, is used to determine how to move LV300. Thus LV300 is now moved only if the error in liquid levels in the upper two columns is much higher or much lower than the error in the lower column liquid level. A third auxiliary variable D3 is the sum of the liquid level errors of the upper and side column. This variable is used to determine whether to draw needed liquid from the storage tank or send excess liquid to the storage tank. The use of these three auxiliary variables allows the controller to more closely replicate the decision-making logic of the plant operator. Three other auxiliary variables are used for control. These are the rates of change, e.g. the time rates of change, of D1, D2, and D3, simply calculated as the current values minus the previous values divided by the controller time step.

The next step performed is the "fuzzification" of the variables. The values calculated in the previous step are qualitatively categorized in terms of linguistic variables. The advantage of classifying the input variables in this manner is that it categorizes variables the same way that an operator would when making decisions. Thus, the controller can be developed such that it replicates the actions of an actual operator.

Figure 3:
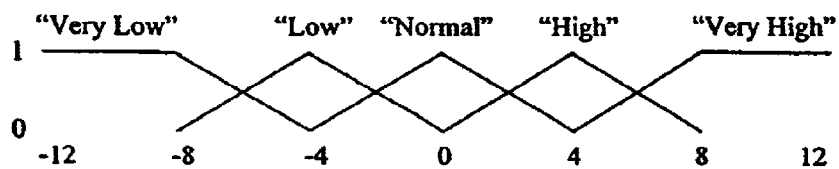
FIG. 3 illustrates the fuzzification or qualitative categorization of parameter values for the embodiment of the invention illustrated in FIGS. 1 and 2.
Figure 3:
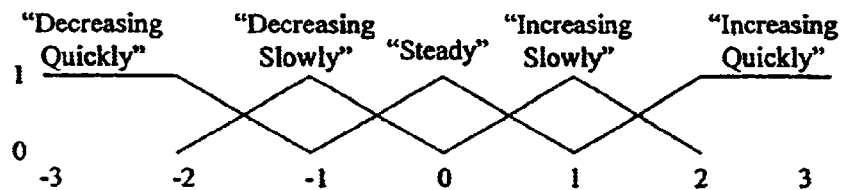
Figure 3:
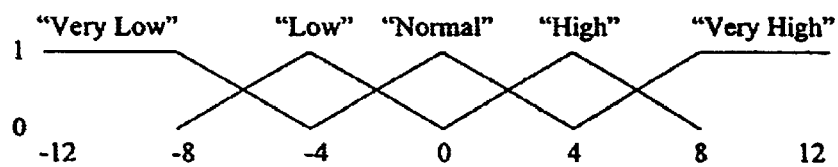
Figure 3:
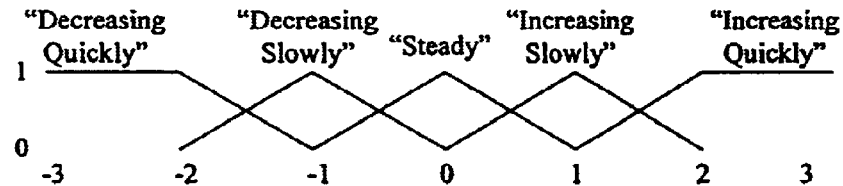
Figure 3:
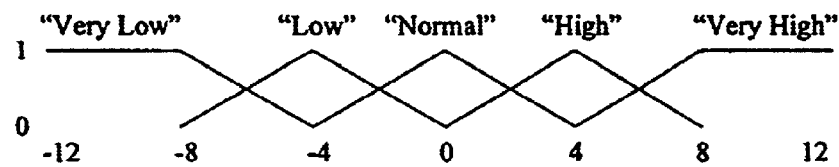
Figure 3:
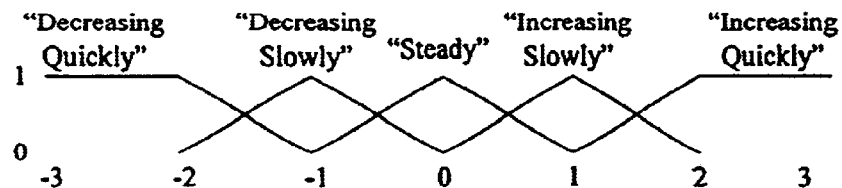

FIG. 3 illustrates the fuzzy sets used to characterize each input in terms of linguistic variables. For example, suppose LI340 has a current value of 35% and a desired value of 30%. LI315 has a current value of 57% and a desired value of 55%. The auxiliary variable D1 would be calculated according to its definition (LI315−desired)−(LI340−desired)=(57%−55%)−(35%−30%)=−3%. The value −3% could belong to both the "Low" characterization as well as the "Normal" characterization. According to the fuzzy set defined for D1, the value −3% belongs to the "Low" characterization with an extent of 0.75 and to the "Normal" characterization with an extent of 0.25. The value −3% cannot be characterized any other way so the extent of membership to the other groups is zero. Thus, the value −3% is characterized as ("Very Low", 0), ("Low", 0.75), ("Normal", 0.25), ("High", 0), ("Very High", 0). A similar procedure is performed for each other controlled variable according to its respective fuzzy set.

It is important to note that each fuzzy set illustrated in FIG. 3 could contain a greater number or a fewer number of characterizations. This is a decision that must be made at design time. In addition, the ranges for each category do not need to be the ones indicated nor do the ranges need to be equal or even symmetric. The appropriate values are determined at design time by interviewing operators to find out what values they would consider to be "Very Low", or "Low", etc.

Referring back to FIG. 2, once all of the controlled variables are fuzzified the next step in the control procedure is to consult a rule base to determine what type of move is to be made to the valves.

Table 1 shows the rule base used to determine how LV315 should move. As an example of how the program uses the rule base consider the case that D1 was characterized as ("Low", 0.75), ("Normal", 0.25). Further consider that dD1dt was characterized as ("Decreasing Quickly", 0.5), ("Decreasing Slowly", 0.5). What is to be determined is the extent to which each of the 25 listed rules applies to the current situation. It is standard practice to define the intersection of two fuzzy sets as the minimum extent of membership. In this case the statement "D1 is low" and "dD1dt is decreasing quickly" has an extent of membership of 0.5 since it is the minimum extent of membership of the two classifications "D1 is low" and "dD1dt is decreasing quickly". Referring to Table 1 the result is that rule #20 has an applicability of 0.5. In a similar fashion the program determines that the applicability of rules 19, 15, and 14 have applicabilities of 0.5, 0.25, and 0.25 respectively. It is desirable to normalize all of the applicabilities such that they sum to 1.0 (this helps when it comes time to perform the next general step—defuzzifying the outputs). Thus, the relative applicabilities of rules 20, 19, 15, and 14 will be ⅓, ⅓, ⅙, and ⅙ respectively. Rule 20 indicates that the desired action is to make LV315 "Decrease Quickly". All of the other rules indicate the LV315 should "Decrease Slowly". Consulting the applicability of each rule the output can be characterized in fuzzy terms as ("Decrease Quickly", ⅓), ("Decrease Slowly", ⅔). So LV315 is to be closed in a manner somewhere between quickly and slowly, but more slowly than quickly.

TABLE 1

| Rule # | If D1 is | And dx1dt is | Then LV315 should be |
|---|---|---|---|
| 1 | "Very High" | "Increasing Quickly" | "Increasing Quickly" |
| 2 | "Very High" | "Increasing Slowly" | "Increasing Quickly" |
| 3 | "Very High" | "Steady" | "Increasing Slowly" |
| 4 | "Very High" | "Decreasing Slowly" | "Increasing Slowly" |
| 5 | "Very High" | "Decreasing Quickly" | "Steady" |
| 6 | "High" | "Increasing Quickly" | "Increasing Quickly" |
| 7 | "High" | "Increasing Slowly" | "Increasing Slowly" |
| 8 | "High" | "Steady" | "Increasing Slowly" |
| 9 | "High" | "Decreasing Slowly" | "Steady" |
| 10 | "High" | "Decreasing Quickly" | "Decreasing Slowly" |
| 11 | "Normal" | "Increasing Quickly" | "Increasing Slowly" |
| 12 | "Normal" | "Increasing Slowly" | "Increasing Slowly" |
| 13 | "Normal" | "Steady" | "Steady" |
| 14 | "Normal" | "Decreasing Slowly" | "Decreasing Slowly" |
| 15 | "Normal" | "Decreasing Quickly" | "Decreasing Slowly" |
| 16 | "Low" | "Increasing Quickly" | "Increasing Slowly" |
| 17 | "Low" | "Increasing Slowly" | "Steady" |
| 18 | "Low" | "Steady" | "Decreasing Slowly" |
| 19 | "Low" | "Decreasing Slowly" | "Decreasing Slowly" |
| 20 | "Low" | "Decreasing Quickly" | "Decreasing Quickly" |
| 21 | "Very Low" | "Decreasing Quickly" | "Decreasing Slowly" |
| 22 | "Very Low" | "Increasing Slowly" | "Decreasing Slowly" |
| 23 | "Very Low" | "Steady" | "Decreasing Slowly" |
| 24 | "Very Low" | "Decreasing Slowly" | "Decreasing Quickly" |
| 25 | "Very Low" | "Decreasing Quickly" | "Decreasing Quickly" |

Similar rule processing is carried out to determine how to move LV300, HIC1737, and HIC1740. It is not necessary that the rules be exactly as listed. The determination of how the valves should be manipulated based on various scenarios should be determined at design time from interviews carried out with experienced plant personnel.

At this stage in the processing the desired movement of the manipulated variables has been expressed in terms of linguistic variables. An operator can readily understand the instruction (we have found that displaying what the controller is doing in these "linguistic terms" on the operator screen increases the level of comfort the operators have with the controller) but the primary control computer cannot. At this point (see FIG. 2) the next step is to translate the fuzzy output instruction into single numeric values that the primary computer can accept. This step is termed "defuzzification".

Figure 4:
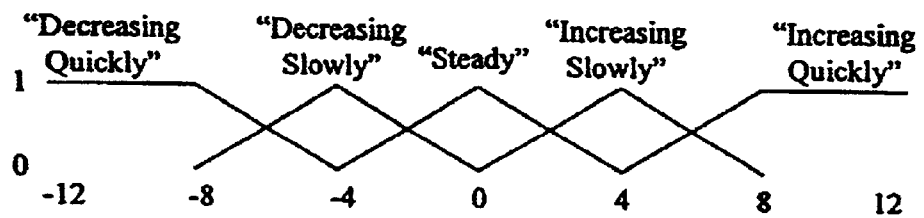
FIG. 4 illustrates the defuzzification of output moves, i.e. how output moves are classified in terms of linguistic variables, for the embodiment of the invention illustrated in FIGS. 1 and 2.
Figure 4:
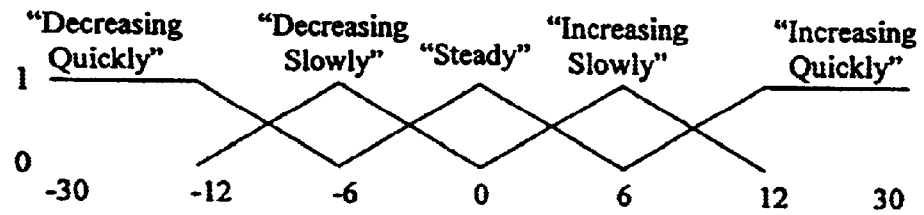
Figure 4:
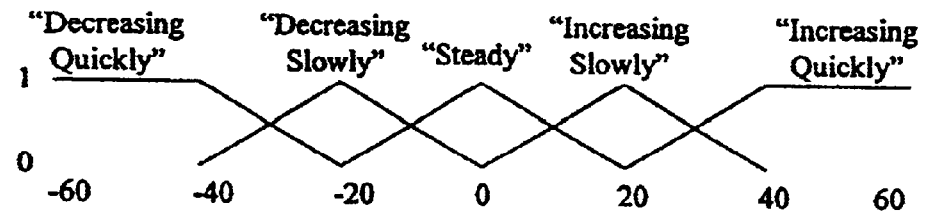
Figure 4:
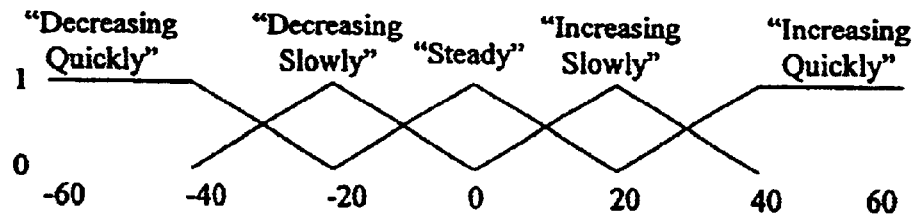

FIG. 4 shows how the output moves are classified in terms of linguistic variables. Defuzzification can be performed in any number of ways. The "center of gravity" method was chosen for this application because of its computational simplicity. For each term in the fuzzy set, a center of gravity is known based on the shape of the set. In the case of dLV315dt the center of gravities are −9 for "Decreasing Quickly", −4 for "Decreasing Slowly", 0 for "Steady", 4 for "Increasing Slowly", and 9 for "Increasing Quickly". For each output variable the extent of memberships of the output to the given classes as well as the centers of gravity of each class can be used to determine the exact value the output value should assume. In the above example where the fuzzy output for dLV315dt was determined to be ("Decrease Quickly", ⅓), ("Decrease Slowly", ⅔), the rate of change of LV315 should be 0.3333*(−9)+0.6667*(−4)=−5.6665%/min. The value that LV315 should assume is therefore the previous value plus the rate of change multiplied by the communication interval chosen for the controller. This value can then be sent to the primary controller.

The final step is to wait until the next communication interval. Once the necessary time has elapsed, the calculation is repeated from step 1.

Figure 5:
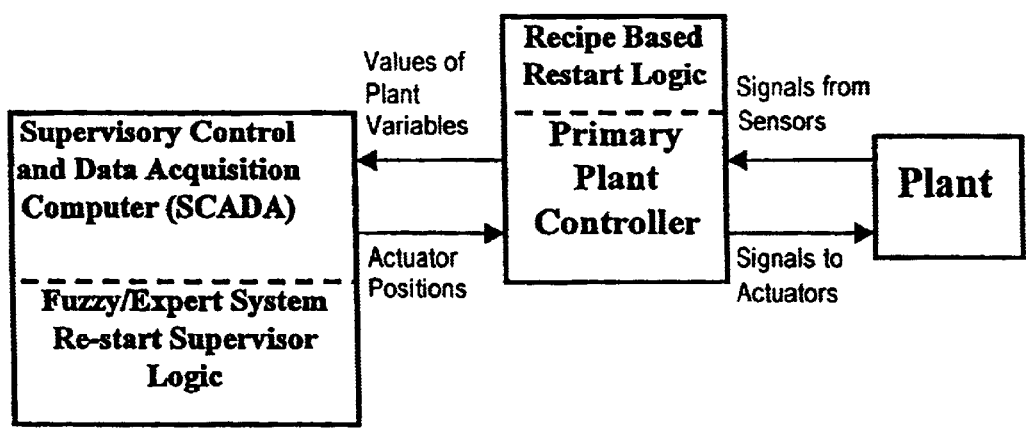
FIG. 5 illustrates a general configuration of the invention with a restart controller.

FIG. 5 illustrates a general configuration of the invention. Here a primary control computer (PLC, DCS, etc.) reads current and voltage signals from plant instrumentation. A basic set of instructions on this computer determines what actions to take based on the inputs from the sensors, and sends the appropriate signals back to the actuators that move the valves, guide vanes, etc. Typically the instruction set on this computer will also contain in its logic a "recipe" based program that will start the plant up. Feedback from the plant may be incorporated in this logic to one extent or another to aid in the start-up process; however, the program for the most part will perform the same tasks the same way each time.

Most plants will also have a higher-level computer tied into the primary control computer to facilitate communication with operators and/or other higher-level control programs. This computer is typically called the SCADA and is the place where the logic for the Fuzzy Logic/Expert System based Re-Start Supervisor is located. The Re-Start Supervisor system could be much more comprehensive than what was previously described. A more general system could regulate, in addition to liquids, stream compositions, temperatures, pressures, flow rates, equipment speeds or power consumption, and could apply to any chemical process, not just the one shown in FIG. 1.

The logic for the control would be very similar to the logic given in FIG. 2. The first step would be to read the values of the process-variables of interest as well as all of the desired values for the variables to be controlled. The second step would comprise performing auxiliary calculations to cast the problem in a form that is more natural to the way an operator would think when operating the plant. A third step would involve the "fuzzification" of all of the controlled variables (i.e. categorizing the variables according to linguistic definitions and determining the extents of membership to each category). Next, a rule base is consulted to determine what kind of changes should be made to the manipulated variables. The fourth step would be to "defuzzify" the manipulated variable moves (i.e. translate them from "fuzzy" numbers to discrete numbers that can be sent back to the primary control computer). Lastly the program waits for the next communication interval before repeating all of the steps.

Other modifications which could be made to the general invention include but are not limited to: the Fuzzy/Expert Re-start supervisor logic could reside on the primary control computer; the Fuzzy/Expert Re-start supervisor logic could reside on any other computer that directly or indirectly communicates with the primary control computer; the recipe based restart logic could reside on any computer, including the SCADA, that communicates either directly or indirectly with the primary control computer; the fuzzy sets that provide the fuzzy description of input and output variables can contain any number of linguistic terms, can be in shapes other than triangular, and can be non-symmetric; and the Re-start supervisor can contain supporting logic such as minimum/maximum limits on manipulated variables, signal processing routines, different control intervals for different tasks, error logging, etc.

Although the invention has been described in detail with reference to a certain particularly preferred embodiment, those skilled in the art will recognize that there are other embodiments of the invention within the spirit and the scope of the claims.

What is claimed is:

1. A method for controlling the operation of a plant comprising:
   (A) determining the value of a plant process parameter, comparing the determined value to the desired value for that parameter, calculating the difference between the determined value and the desired value, and calculating the rate of change of said difference between the determined value and the desired value;
   (B) qualitatively categorizing the said difference between the determined value and the desired value, and qualitatively categorizing the said rate of change of said difference between the determined value and the desired value;
   (C) determining by referring to a set of rules for qualitative categories how such process parameter should be changed to become closer to the desired value;
   (D) determining a numerical value for adjusting a plant element to change such process parameter to become closer to the desired value; and
   (E) adjusting said plant element to change such process parameter so that it is closer to the desired value, and wherein said method acts in conjunction with a recipe based restart system to perform feedback based adjustments.

2. The method of claim 1 wherein the said rate of change is the time of rate of change.

3. The method of claim 1 wherein said feedback based adjustments are applied to final control elements.

4. The method of claim 1 wherein the plant is a cryogenic rectification plant.

5. The method of claim 1 wherein the process parameter is liquid level in a column of the plant.

6. The method of claim 1 wherein the plant element which is adjusted is a valve.

* * * * *